United States Patent
Hayashi

(10) Patent No.: US 12,227,013 B2
(45) Date of Patent: Feb. 18, 2025

(54) INFORMATION PROCESSING DEVICE, INFORMATION PROCESSING METHOD, AND NON-TRANSITORY COMPUTER-READABLE STORAGE MEDIUM STORING PROGRAM

(71) Applicant: SEIKO EPSON CORPORATION, Tokyo (JP)

(72) Inventor: Ryotaro Hayashi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 239 days.

(21) Appl. No.: 18/145,393

(22) Filed: Dec. 22, 2022

(65) Prior Publication Data

US 2023/0202192 A1 Jun. 29, 2023

(30) Foreign Application Priority Data

Dec. 27, 2021 (JP) .................................. 2021-212434

(51) Int. Cl.
*B41J 2/21* (2006.01)
(52) U.S. Cl.
CPC .................. *B41J 2/2103* (2013.01)
(58) Field of Classification Search
CPC ...................................................... B41J 2/2103
See application file for complete search history.

(56) References Cited

U.S. PATENT DOCUMENTS

2017/0264789 A1  9/2017  Miyahara

FOREIGN PATENT DOCUMENTS

| CN | 110091630 A | * | 8/2019 | ............. B41J 29/42 |
| JP | 2017-159552 A |  | 9/2017 | |

* cited by examiner

*Primary Examiner* — Justin Seo
(74) *Attorney, Agent, or Firm* — WORKMAN NYDEGGER

(57) ABSTRACT

An information processing device includes: an acquisition unit acquiring a designated value of a transmittance of one or more layers included in a plurality of layers stacked on each other and printed on a print medium, the plurality of layers including one or two image layers printed to be visible from one side of the print medium and a foundation layer serving as a foundation of the one or two image layers, the one or more layers including the foundation layer; and a decision unit deciding a layer configuration that is a configuration of the foundation layer, based on the designated value acquired by the acquisition unit.

9 Claims, 7 Drawing Sheets

| TYPE OF PAINT | IMAGE RESOLUTION (dpi) | CONCENTRATION (%) | INCIDENT LIGHT | TRANSMITTANCE |
|---|---|---|---|---|
| WHITE COLORING MATERIAL | * * * | 40 | BACK-SIDE INCIDENT LIGHT | * * * |
| K COLORING MATERIAL | * * * | 70 | BACK-SIDE INCIDENT LIGHT | * * * |
| C COLORING MATERIAL | * * * | * * * | * * * | * * * |
| M COLORING MATERIAL | * * * | * * * | * * * | * * * |
| Y COLORING MATERIAL | * * * | * * * | * * * | * * * |
| K COLORING MATERIAL | * * * | 80 | BACK-SIDE INCIDENT LIGHT | * * * |
| * * * | * * * | * * * | * * * | * * * |
| WHITE COLORING MATERIAL | * * * | 140 | BACK-SIDE INCIDENT LIGHT | * * * |

130c

RESOLUTION INCREASE

FIG. 11

| TYPE OF PAINT | AMOUNT OF PAINT DROPLETS | IMAGE RESOLUTION (dpi) | CONCENTRATION (%) | INCIDENT LIGHT | TRANSMITTANCE |
|---|---|---|---|---|---|
| WHITE COLORING MATERIAL | SMALL | * * * | 40 | BACK-SIDE INCIDENT LIGHT | * * * |
| K COLORING MATERIAL | SMALL | * * * | 70 | BACK-SIDE INCIDENT LIGHT | * * * |
| C COLORING MATERIAL | SMALL | * * * | * * * | * * * | * * * |
| M COLORING MATERIAL | SMALL | * * * | * * * | * * * | * * * |
| Y COLORING MATERIAL | SMALL | * * * | * * * | * * * | * * * |
| K COLORING MATERIAL | MEDIUM | * * * | * * * | BACK-SIDE INCIDENT LIGHT | * * * |
| * * * | * * * | * * * | * * * | * * * | * * * |
| WHITE COLORING MATERIAL | LARGE | * * * | * * * | BACK-SIDE INCIDENT LIGHT | * * * |

130c

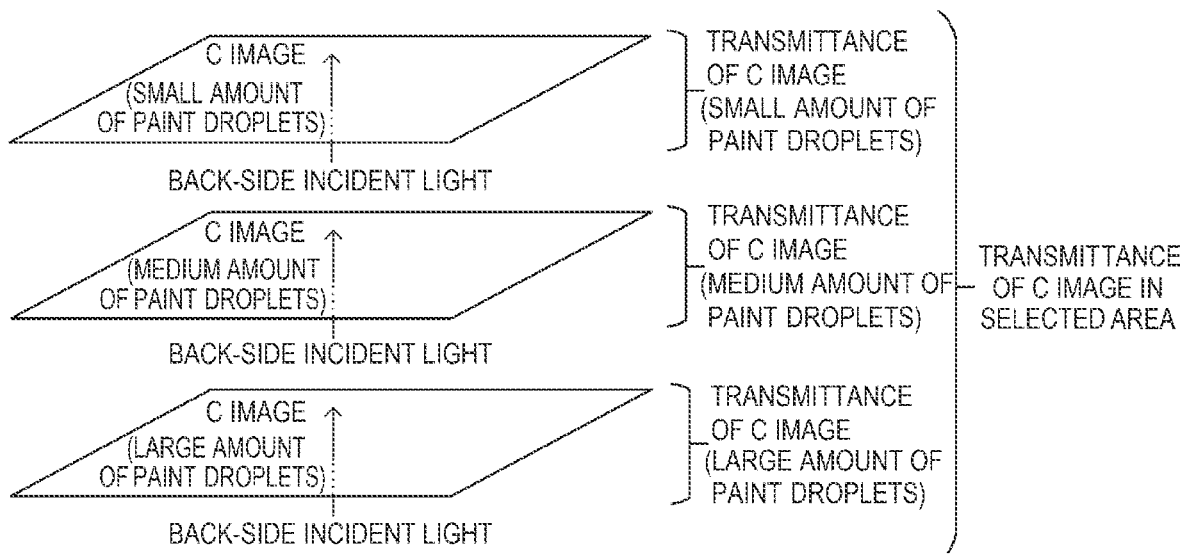

FIG. 12

INFORMATION PROCESSING DEVICE, INFORMATION PROCESSING METHOD, AND NON-TRANSITORY COMPUTER-READABLE STORAGE MEDIUM STORING PROGRAM

The present application is based on, and claims priority from JP Application Serial Number 2021-212434, filed Dec. 27, 2021, the disclosure of which is hereby incorporated by reference herein in its entirety.

BACKGROUND

1. Technical Field

The present disclosure relates to an information processing device, an information processing method, and a non-transitory computer-readable storage medium storing a program.

2. Related Art

There is a printing device that prints a plurality of layers formed of an image layer, a foundation layer serving as a foundation of an image, and the like, stacked on each other. JP-A-2017-159552 discloses a configuration for previewing the layer configuration of a plurality of layers to be printed.

When printing a plurality of layers stacked on each other, it is desired that the layer configuration of the foundation layer is set in such a way that one or more layers including the foundation layer achieve a proper transmittance for predetermined light in order to maintain the visibility (easiness of visual checking) of an image to be printed, or the like. According to the related art, a user determines and sets the layer configuration of the foundation layer. However, when the user sets the layer configuration of the foundation layer, the user needs to make a subjective determination and this takes time and effort.

SUMMARY

According to an aspect of the present disclosure, an information processing device includes: an acquisition unit acquiring a designated value of a transmittance of one or more layers included in a plurality of layers stacked on each other and printed on a print medium, the plurality of layers including one or two image layers printed to be visible from one side of the print medium and a foundation layer serving as a foundation of the one or two image layers, the one or more layers including the foundation layer; and a decision unit deciding a layer configuration that is a configuration of the foundation layer, based on the designated value acquired by the acquisition unit.

BRIEF DESCRIPTION OF THE DRAWINGS

FIG. 1 shows an example of the configuration of an image processing device or the like.

FIG. 11 shows an example of characteristic information.

FIG. 12 explains the transmittance of a C image.

DESCRIPTION OF EXEMPLARY EMBODIMENTS

An embodiment of the present disclosure will now be described in the following order:

(1) First Embodiment
(1-1) Configuration of Information Processing Device
(1-2) Print Control Processing
(2) Second Embodiment
(3) Other Embodiments.

(1) First Embodiment (1-1) Configuration of Information Processing Device

Figure 1:
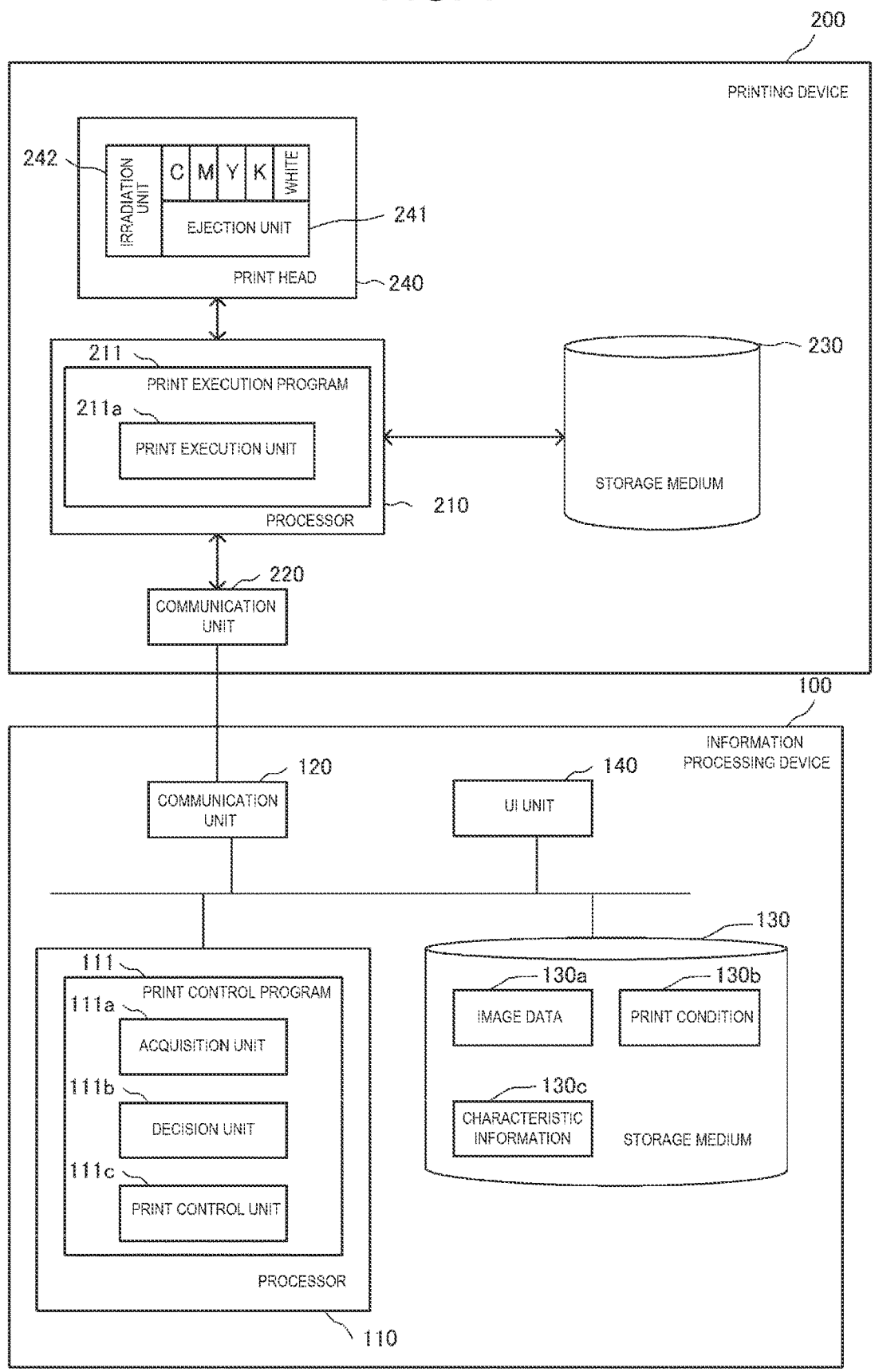

FIG. 1 shows an example of the configuration of an information processing device 100 and a printing device 200 according to this embodiment. The information processing device 100 in this embodiment is an information processing device controlling the printing device 200 and is, for example, a personal computer, a tablet device, a smartphone, or the like. The printing device 200 is a printing device printing an image on a print medium (for example, an acrylic plate, a glass plate, a medium made of a resin (for example, a smartphone case or the like made of a resin), a print paper, or the like) in response to an instruction from the information processing device 100. In this embodiment, the printing device 200 prints on the print medium, using a predetermined paint. In this embodiment, the predetermined paint is cyan (C), magenta (M), yellow (Y), black (K), and white coloring materials (for example, dyes, pigments, or the like). In the description below, C-color, M-color, Y-color, K-color, and white coloring materials used by the printing device 200 are referred to as a C coloring material, an M coloring material, a Y coloring material, a K coloring material, and a white coloring material, respectively. The paints used by the printing device 200 in this embodiment are paints cured by ultraviolet irradiation. In this embodiment, a side where an image is printed, of the print medium, is defined to as a front side. That is, a side opposite to the side where an image is printed, of the print medium, is defined to as a back side. In this embodiment, the printing device 200 ejects a predetermined amount of the paint to each pixel where the paint is ejected, in the print medium. The pixel is an area formed by dividing a print area, based on an image resolution. The image resolution is an indicator indicating the density of the paint applied to the print medium (density of pixel) and is expressed, for example, by the unit of dots per inch (dpi). In this embodiment, the printing device 200 is an inkjet printing device. However, the printing device 200 may also be a laser printing device using a toner as the paint.

Figures 2, 3:
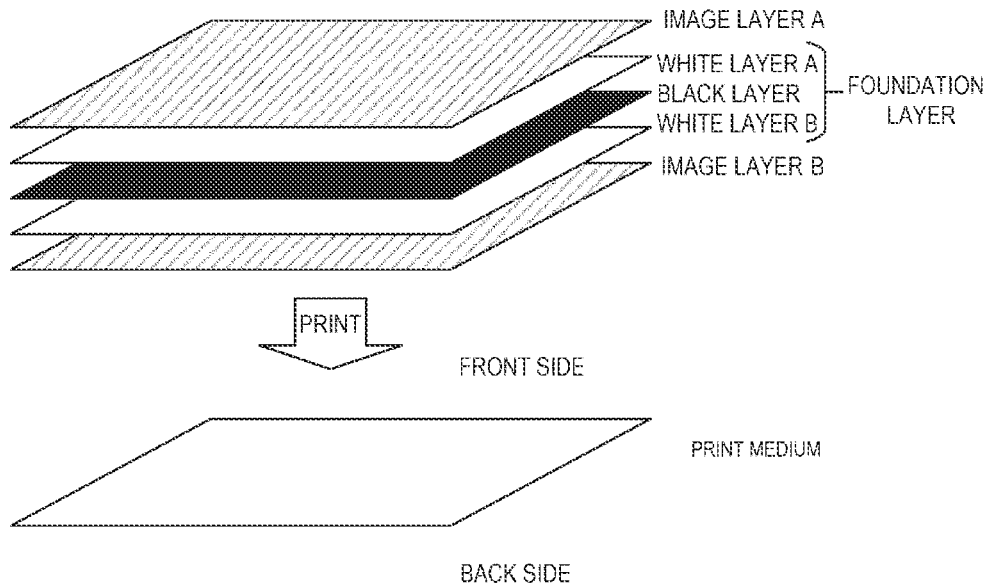
FIG. 2 shows an outline of an example of a print layer to be printed.
FIG. 3 shows an example of characteristic information.

In this embodiment, a case where the printing device 200 prints a plurality of layers stacked on each other, including an image layer A of an image visible from the front side, an image layer B of an image visible from the back side, and a foundation layer arranged between the image layers and serving as a foundation of each image layer, on a transparent print medium, as shown in FIG. 2, is described as an example. In this embodiment, the image layer A is arranged as an outermost layer on the front side, among the plurality of layers to be printed, and is therefore visible from the front side. The image layer B is arranged as an outermost layer on the back side, among the layers to be printed, and is therefore visible from the back side. In this embodiment, the foundation layer is formed of a white layer A and a white layer B formed by applying the white coloring material at a predetermined concentration to an entire print area, and a black layer arranged between the white layer A and the white layer B and formed by applying the K coloring material at a predetermined concentration to the entire print area. In the description below, the plurality of layers to be printed are defined as a print layer. The print area is a print target area on the surface of the print medium where printing is performed. The concentration is an indicator indicating the proportion of the area occupied by the corresponding paint, in the print target area. In this embodiment, a predetermined amount of the paint is ejected to each pixel and therefore the concentration indicates the proportion of the number of pixels coated with the corresponding paint to the total number of pixels in the target area.

In this embodiment, it is assumed that, when a print medium on which printing is completed is in use, light with a relatively high intensity enters the print medium from the back side of the print medium. In this embodiment, it is assumed that the print medium is, for example, an advertisement medium or the like attached to a shop window. It is assumed that, from indoors, light of a fluorescent lamp enters the advertisement medium attached to the shop window and that relatively intense light such as sunlight is cast on the advertisement medium from outdoors. In such a case, the light from outdoors may be transmitted through the print layer and therefore the image on the image layer on the outdoor side may be seen through the image layer on the indoor side. In such a case, the visibility (easiness of checking) of the image layer on the indoor side drops. In the description below, the light assumed to enter the print medium from the back side is referred to as back-side incident light. In the description below, the light assumed to enter the print medium from the front side is referred to as front-side incident light.

In this embodiment, the printing device 200 ejects the paint to the print medium and casts ultraviolet light on the ejected paint, and thus performs printing. The information processing device 100 and the printing device 200 are coupled in such a way as to be able to communicate with each other via a wire or wirelessly. The information processing device 100 and the printing device 200 may be configured as integrated hardware and the information processing device 100 installed in the printing device 200 may control the printing device 200.

In this embodiment, a case where the information processing device 100 adjusts the transmittance for the back-side incident light of a layer formed of the image layer B and the foundation layer combined, in the print layer, in order to maintain the visibility of the image layer A, is described as an example. Each layer in the foundation layer in this embodiment functions as a light-shielding layer blocking at least a part of the light entering the print layer. The white layer included in the foundation layer serves as the foundation of the image layer. As the background of the image layer is made white, which is less likely to inhibit the coloring, the white layer functions as an assisting layer assisting the color development of the image layer.

The hardware included in the information processing device 100 and the printing device 200 will now be described.

The information processing device 100 has a processor 110, a communication unit 120, a storage medium 130, and a UI unit 140. The information processing device 100 also has a random-access memory (RAM) and a read-only memory (ROM), not illustrated. The processor 110 executes various programs stored in the ROM, the storage medium 130, and the like, and thus controls the information processing device 100. The processor 110 may be formed of a single chip or a plurality of chips. In this embodiment, the processor 110 is a central processing unit (CPU). However, the processor 110 may be formed of an ASIC or the like, or may be formed of a CPU and an ASIC. The communication unit 120 has a circuit used for communication conforming to various wired or wireless communication protocols with an external device such as the printing device 200. The storage medium 130 stores various programs such as a print control program 111 for executing processing of controlling the printing via the printing device 200, and various kinds of information such as image data 130a, a print condition 130b, and characteristic information 130c.

The image data 130a is data of the image layers A, B to be printed. In this embodiment, the data of each layer of the image layer A and the image layer B represented by the image data 130a is RGB data that expresses each pixel in the image layers A, B divided by a predetermined number of pixels (for example, 640×480, 1200×1600, or the like), in the form of a gradation value in 3 channels of RGB.

The print condition 130b represents various conditions for the printing of the image data 130a (for example, the print area in the print medium, the image resolution of the image layers A, B, and the like). In this embodiment, the print condition 130b also includes data of a layer configuration of the foundation layer. The layer configuration is the configuration of the foundation layer and represents the layers included in the foundation layer, the order in which the layers are stacked, the image resolution of each layer, and the concentration of the paint in each layer. In this embodiment, the print condition 130b is designated by a user. However, the print condition 130b may be determined in advance.

The characteristic information 130c is information representing a characteristic of each paint used in the printing device 200. In this embodiment, this characteristic is a characteristic representing the easiness of transmission of various kinds of light when the light enters each layer that is formed by applying the paint to an area of a specific size under various conditions (image resolution, concentration). In this embodiment, the characteristic information 130c represents the transmittance of light when various kinds of light enter one layer (area coated with a paint) formed by applying one type of paint to an area of a specific size under various conditions (image resolution, concentration). In this embodiment, the characteristic information 130c is stored in the storage medium 130 in advance.

Figure 4:
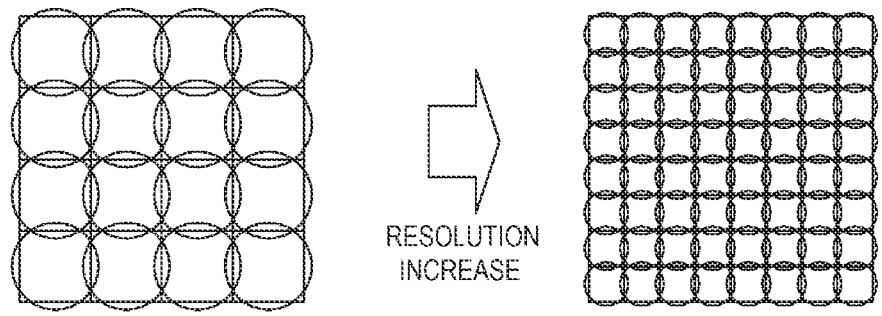
FIG. 4 explains an increase in image resolution.

The characteristic information 130c in this embodiment is table information showing the correspondence between the type of the paint, the image resolution (dpi), the concentration (%), the incident light, and the transmittance, as shown in FIG. 3. The information representing the type of the paint is, for example, the name, serial number, and the like of the paint. Various types of paints are applied in advance with various image resolutions and various concentrations. Then, various kinds of light are made to enter the coated area and the transmittance is measured. Thus, the characteristic information 130c is found. FIG. 4 shows the difference in the way of applying the paint due to the difference in the image resolution. Each circular object in FIG. 4 represents the paint applied to one pixel. As shown in FIG. 4, the amount of the paint applied to a predetermined area is constant regardless of the image resolution, whereas the size of each gap that can be generated between paints decreases as the image resolution becomes higher. The present applicants have conducted an experiment in which various types of paints are applied in advance with various image resolutions and various concentrations, then various kinds of light are made to enter the coated area, and the transmittance is measured, and have found that the light-shielding rate becomes higher as the image resolution becomes higher, based on the result of the experiment.

The UI unit 140 has an input unit accepting an input from the user, such as a mouse, a keyboard, a touch pad, or an operation unit on a touch panel, and an output unit used to present information to the user, such as a monitor, a display unit on a touch panel, or a speaker.

The printing device 200 has a processor 210, a communication unit 220, a storage medium 230, and a print head 240. The printing device 200 also has a RAM and a ROM, not illustrated. The processor 210 executes various programs stored in the ROM, the storage medium 230, and the like, and thus controls the printing device 200. The processor 210 may be formed of a single chip or a plurality of chips. In this embodiment, the processor 210 is a CPU. However, the processor 210 may be formed of an ASIC or the like, or may be formed of a CPU and an ASIC. The communication unit 220 has a circuit used for communication conforming to various wired or wireless communication protocols with an external device such as the information processing device 100. The storage medium 230 stores various programs such as a print execution program 211 for controlling the execution of printing, and various kinds of information.

The print head 240 ejects the paint to the print medium and casts ultraviolet light thereon. The processor 210 causes the print head 240 to eject the paint to the print medium and cast ultraviolet light thereon, while moving the print head 240 via a drive mechanism of the print head 240. The processor 210 repeats printing on a per line basis on the print medium via the print head 240 and thus performs printing. In the description below, the direction of the line is referred to as a main scanning direction. In the description below, a direction perpendicular to the main scanning direction and parallel to the print medium arranged at the time of printing is referred to as a sub scanning direction. In the description below, the printing of one line performed by the print head 240 during printing while moving from one end to the other end of the print area in the main scanning direction on the print medium is referred to as one print path. The number of times a print path is made that is required for printing in the same area in the print area is referred to as the number of print paths. The print head 240 has an ejection unit 241 used to eject various paints, and an irradiation unit 242 casting ultraviolet light on the paint ejected by the ejection unit 241. The ejection unit 241 is a nozzle used to eject each of the CMYK and white coloring materials. The ejection unit 241 ejects each coloring material to the print medium and thus applies each coloring material to the print medium. The irradiation unit 242 is a lamp casting ultraviolet light and arranged at both ends in the main scanning direction of the ejection unit 241. When the print head 240 moves for scanning, the processor 210 causes the irradiation unit 242 located at a rear part in the scanning direction of the print head 240 to cast ultraviolet light onto the paint ejected to the print medium by the ejection unit 241.

The functions of the information processing device 100 and the printing device 200 will now be described.

The processor 110 of the information processing device 100 executes the print control program 111 stored in the storage medium 130 and thus functions as an acquisition unit 111a, a decision unit 111b, and a print control unit 111c.

The acquisition unit 111a is a function of acquiring a designated value of the transmittance for predetermined light of one or more layers including the foundation layer, included in the print layer to be printed on the print medium. In the description below, the designated value of the transmittance acquired by the function of the acquisition unit 111a is referred to as a designated transmittance value.

In this embodiment, by the function of the acquisition unit 111a, the processor 110 acquires the designated value of the transmittance for the back-side incident light of a layer formed of the foundation layer and the image layer B combined, as the designated transmittance value. In this embodiment, the processor 110 accepts an input of the designated transmittance value, based on an operation to the UI unit 140 by the user, and thus acquires the designated transmittance value. Also, the processor 110 accepts an input of the print condition 130b, based on an operation to the UI unit 140 by the user, and stores the print condition 130b in the storage medium 130.

The decision unit 111b is a function of deciding a layer configuration, which is the configuration of the foundation layer in the print layer group, based on the designated transmittance value acquired by the function of the acquisition unit 111a.

In this embodiment, by the function of the decision unit 111b, the processor 110 decides the layer configuration, based on the designated transmittance value and the characteristic information 130c representing the transmittance for the back-side incident light of the layer formed of each paint used to print the foundation layer. Details of the processing by the processor 110 involving the decision unit 111b will now be described. The processor 110 acquires the initial value of the layer configuration of the foundation layer represented by the print condition 130b, as a tentative value of the layer configuration. In the description below, the tentative value of the layer configuration is referred to as a tentative configuration. In this embodiment, the concentration of the white layer A, the black layer, and the white layer B indicated by the initial value of the layer configuration of the foundation layer represented by the print condition 130b is 40%, 70%, and 40%, respectively. The processor 110 also acquires print image data in the case of printing the image layer B represented by the image data 130a under the condition represented by the print condition 130b. The print image data is data representing which coloring material to apply to which pixel with what image resolution, in the print area in the print medium. More specifically, the processor 110 enlarges or reduces RGB data of the image layer B represented by the image data 130a, based on the image resolution represented by the print condition 130b. The processor 110 then converts the enlarged or reduced RGB data into gradation data for each color of the predetermined coloring materials used in the printing device 200. In this embodiment, the predetermined coloring materials are the C coloring material, the M coloring material, the Y coloring material, and the K coloring material. The processor 110 performs halftone processing, based on the converted gradation data, and decides which coloring material to eject in what amount to each pixel in the print area in order to achieve the color of the image layer B. The processor 110 acquires data representing which coloring material to eject in what amount to which pixel in the print medium, thus decided, as the print image data of the image layer B.

Figure 5:
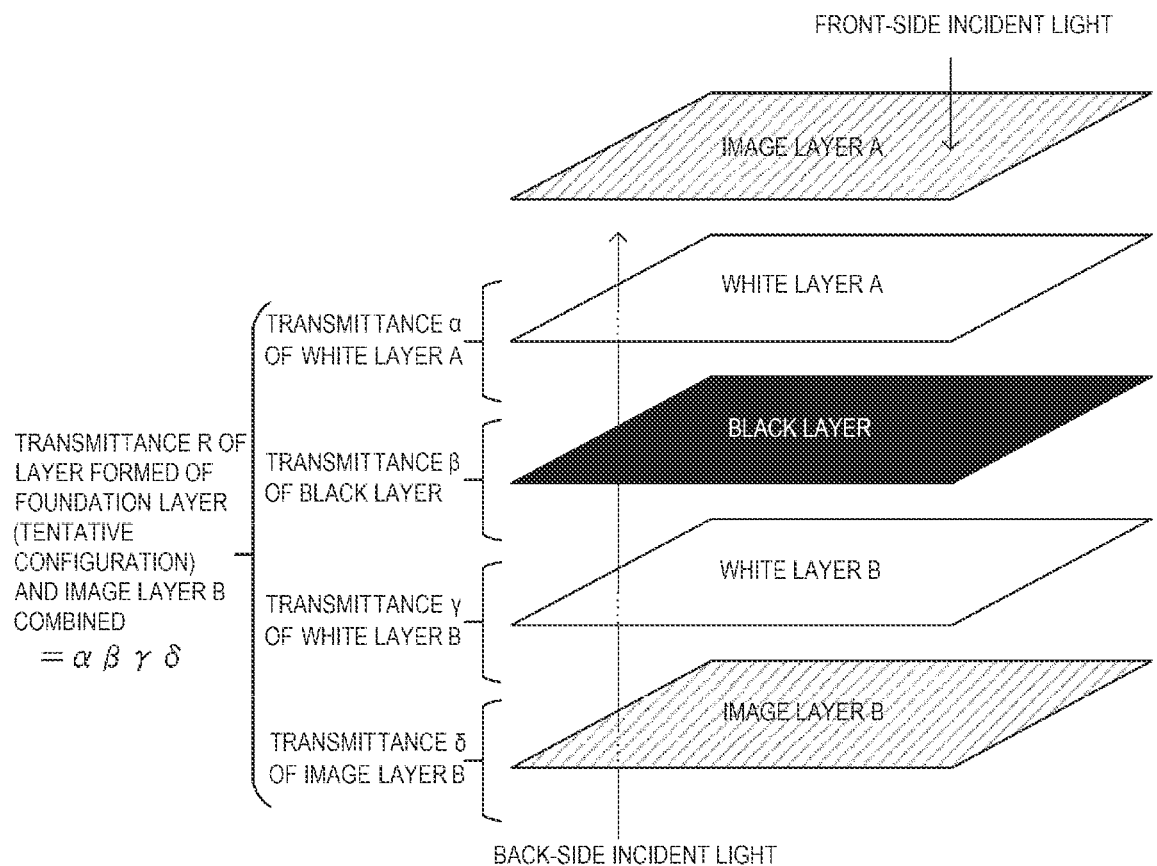
FIG. 5 explains a transmittance of a layer formed of a foundation layer and an image layer combined.

Subsequently, the processor 110 acquires the transmittance for the back-side incident light of a layer formed of the image layer B and the foundation layer of the tentative configuration combined. Details of the processing of acquiring this transmittance will now be described. In the description below, the transmittance for the back-side incident light of the layer formed of the image layer B and the foundation layer of the tentative configuration combined is expressed by R. In the description below, the transmittance for the back-side incident light of the white layer A of the foundation layer of the tentative configuration is expressed by α. In the description below, the transmittance for the back-side incident light of the black layer of the foundation layer of the tentative configuration is expressed by β. In the description below, the transmittance for the back-side incident light of the white layer B of the foundation layer of the tentative configuration is expressed by γ. In the description below, the transmittance for the back-side incident light of the image layer B is expressed by δ. As shown in FIG. 5, the transmittance R is expressed by the multiplication of the transmittances α to δ.

The processor 110 acquires the image resolution in the white layer A in the tentative configuration and the concentration of the white coloring material, from the tentative configuration. The processor 110 then acquires the transmittance corresponding to the white coloring material, the acquired image resolution, the acquired concentration, and the back-side incident light, from the characteristic information 130c, and defines this transmittance as the transmittance α.

The processor 110 also acquires the image resolution in the black layer in the tentative configuration and the concentration of the K coloring material, from the tentative configuration. The processor 110 then acquires the transmittance corresponding to the K coloring material, the acquired image resolution, the acquired concentration, and the back-side incident light, from the characteristic information 130c, and defines this transmittance as the transmittance β.

The processor 110 also acquires the image resolution in the white layer B in the tentative configuration and the concentration of the white coloring material, from the tentative configuration. The processor 110 then acquires the transmittance corresponding to the white coloring material, the acquired image resolution, the acquired concentration, and the back-side incident light, from the characteristic information 130c, and defines this transmittance as the transmittance γ.

Figure 6:
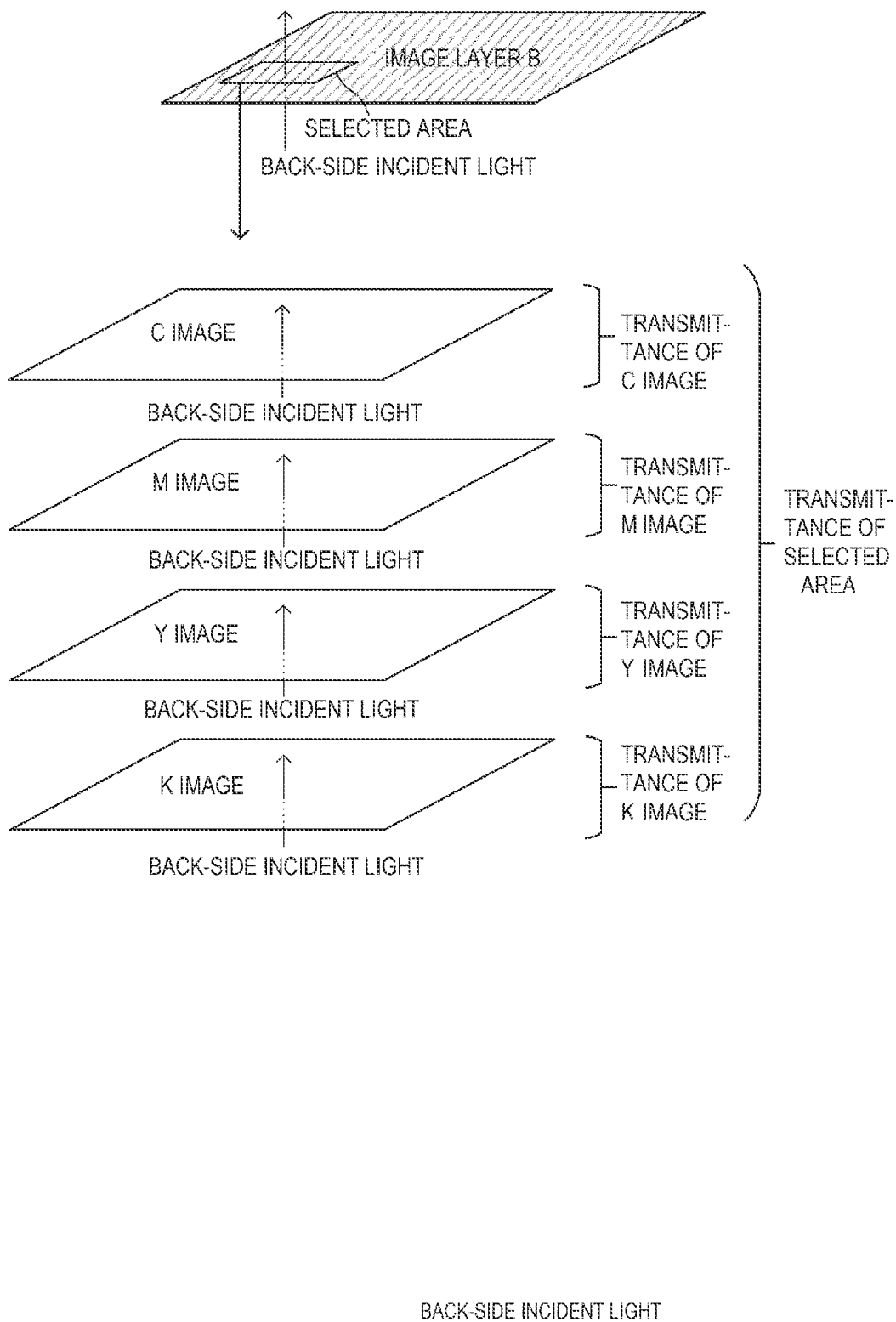
FIG. 6 explains the transmittance of the image layer.

The processing in which the processor 110 acquires the transmittance δ of the image layer B to be printed in the print area will now be described, using FIG. 6. The processor 110 selects a rectangular area of a predetermined size (for example, 10×10 pixels, 100×100 pixels, 500×500 pixels, the entire print area, or the like), from the image layer B to be printed in the print area. In the description below, the area selected at this point is referred to as a selected area. The image in the selected area can be regarded as an image of a combination of an image formed of the C coloring material (hereinafter referred to as the C image), an image formed of the M coloring material (hereinafter referred to as the M image), an image formed of the Y coloring material (hereinafter referred to as the Y image), and an image formed of the K coloring material (hereinafter referred to as the K image). Thus, the processor 110 finds the transmittance for the back-side incident light of each of the C image, the M image, the Y image, and the K image in the selected area and multiplies the resulting transmittances, and thus finds the transmittance for the back-side incident light of the selected area. In this embodiment, the processor 110 derives the proportion of the number of pixels coated with the C coloring material to the total number of pixels in the selected area, as the concentration of the C image in the selected area, based on the print image data of the image layer B. Similarly, the processor 110 derives the proportion of the number of pixels coated with each of the M coloring material, the Y coloring material, and the K coloring material to the total number of pixels in the selected area, as the concentration of each of the M image, the Y image, and the K image in the selected area, based on the print image data of the image layer B.

The processor 110 acquires the transmittance corresponding to the C coloring material, the image resolution of the image layer B, the concentration of the C image in the selected area, and the back-side incident light, from the characteristic information 130c, and defines this transmittance as the transmittance for the back-side incident light of the C image in the selected area. The processor 110 also acquires the transmittance corresponding to the M coloring material, the image resolution of the image layer B, the concentration of the M image in the selected area, and the back-side incident light, from the characteristic information 130c, and defines this transmittance as the transmittance for the back-side incident light of the M image in the selected area. The processor 110 also acquires the transmittance corresponding to the Y coloring material, the image resolution of the image layer B, the concentration of the Y image in the selected area, and the back-side incident light, from the characteristic information 130c, and defines this transmittance as the transmittance for the back-side incident light of the Y image in the selected area. The processor 110 also acquires the transmittance corresponding to the K coloring material, the image resolution of the image layer B, the concentration of the K image in the selected area, and the back-side incident light, from the characteristic information 130c, and defines this transmittance as the transmittance for the back-side incident light of the K image in the selected area.

The processor 110 multiplies the acquired transmittances for the back-side incident light of the C image, the M image, the Y image, and the K image in the selected area, and thus derives the transmittance for the back-side incident light of the selected area.

The processor 110 selects a rectangular area of a predetermined size that is different from the already selected area, from the image layer B, as a selected area again, and derives the transmittance for the back-side incident light of the selected area. The processor 110 repeats the above processing until deriving the transmittances for the back-side incident light of rectangular areas of all the sizes included in the image layer B. The processor 110 specifies the maximum transmittance from among the derived transmittances and defines this transmittance as the transmittance δ of the image layer B.

The processor 110 multiplies the transmittances α, β, γ, δ and thus derives the transmittance R. The processor 110 determines whether the transmittance R is within a predetermined range corresponding to the designated transmittance value or not. In this embodiment, the predetermined range corresponding to the designated transmittance value is a range of the designated transmittance value±a predetermined threshold (for example, 3%, 5% or the like). When the processor 110 has determined that the transmittance R is within the range corresponding to the designated transmittance value, the processor 110 decides the tentative configuration as the layer configuration of the foundation layer.

More specifically, the processor 110 updates the content of the layer configuration of the foundation layer represented by the print condition 130*b* with the content of the tentative configuration. When the processor 110 has decided that the transmittance R is out of the range corresponding to the designated transmittance value, the processor 110 adjusts the tentative configuration in the following manner.

A case where the transmittance R is out of the range corresponding to the designated transmittance value and is higher than the designated transmittance value will now be described.

The processor 110 increases the image resolution of each layer in the foundation layer of the tentative configuration. Any value may be set as the scale of increase. When the image resolution of each layer in the foundation layer of the tentative configuration is an upper limit value, the processor 110 does not adjust the tentative configuration in terms of the image resolution.

The processor 110 increases the concentration of the black layer represented by the tentative configuration, by a predetermined amount of increase. In this embodiment, this predetermined amount of increase is 10%. However, the predetermined amount of increase may be another value such as 3%, 5%, or 20%. The processor 110 increases the concentration of the white layer A and the white layer B represented by the tentative configuration, by a predetermined amount of increase that is larger than the amount of increase for the black layer. In this embodiment, this predetermined amount of increase is 40%. However, the predetermined amount of increase may be another value such as 5%, 10%, 20%, or 30%.

The increase in the concentration of the black layer increases the probability that the black color of the black layer may be transmitted through the white layers A, B and may become visible from the front side and the back side, lowering the visibility of the image layer A and the image layer B. Therefore, in this embodiment, the processor 110 increases the concentration of the white layers A, B by the amount of increase that is larger than the amount of increase in the concentration of the black layer. Thus, the processor 110 can reduce the probability that the black color of the black layer may be transmitted through the white layers A, B and may lower the visibility of the image layer A and the image layer B.

The processor 110 also determines whether the image layer A and the image layer B are light-colored or not, based on the type and concentration of the paint used to form each of the image layer A and the image layer B. When the processor 110 has determined that the image layer A and the image layer B are light-colored, the processor 110 increases the concentration of the white layers A, B serving as the foundation of the image layer A and the image layer B, by a predetermined amount of increase. More specifically, the processor 110 operates as follows. The processor 110 acquires the print image data of the image layer A as in the case of the print image data of the image layer B. The processor 110 specifies the type of the paint used to form the image layer A, based on the print image data of the image layer A. The processor 110 specifies the concentration of each specified type of paint in the entirety of the image layer A, based on the print image data of the image layer A. In this embodiment, correspondence information between the concentration in the image of each type of paint used to form the image and whether the image is light-colored or not, is stored in the storage medium 130 in advance. This correspondence information is found by forming an image using various types of paints and various concentrations in advance and then determining whether the formed image is light-colored or not (for example, user's subjective determination, determination using a color measurement device, or the like). The processor 110 determines whether the image layer A is light-colored or not, based on the type of the paint used to form the image layer A, the concentration of each type of paint in the entirety of the image layer A, and the correspondence information. The processor 110 similarly determines whether the image layer B is light-colored or not.

When the image layer A is light-colored, the processor 110 increases the concentration of the white layer A serving as the foundation of the image layer A and represented by the tentative configuration, by a predetermined amount of increase. In this embodiment, this predetermined amount of increase is 20%. However, the predetermined amount of increase may be another value such as 3%, 5%, 10%, or 30%. Similarly, when the image layer B is light-colored, the processor 110 increases the concentration of the white layer B serving as the foundation of the image layer B and represented by the tentative configuration, by a predetermined amount of increase.

When the image layer A and the image layer B are light-colored, the color of the foundation layer is more likely to be transmitted through the image layers than when the image layer A and the image layer B are dark-colored. Therefore, when the image layer A and the image layer B are light-colored and the concentration of the black layer in the foundation layer is increased, it is probable that the black color of the black layer may be transmitted through the image layers and that the visually recognized color of the image layers A, B may change. When the image layer A and the image layer B are light-colored, the processor 110 increases the concentration of the white layers A, B serving as the foundation and thus can reduce the probability that the visually recognized color of the image layers A, B may change as described above.

Figure 7:
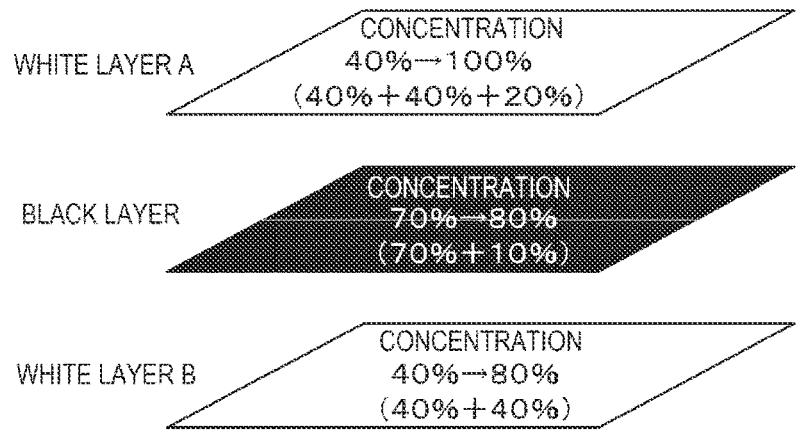
FIG. 7 explains an increase in the concentration of each layer in the foundation layer.

Through the above processing, the tentative configuration is adjusted in such a way as to increase the concentration of each layer in the foundation layer. FIG. 7 shows the result of the adjustment of the concentration of each layer in the foundation layer represented by the tentative configuration when the image layer A is light-colored and the image layer B is not light-colored.

A case where the transmittance R is out of the range corresponding to the designated transmittance value and is lower than the designated transmittance value will now be described.

When the transmittance R is lower than the designated transmittance value, the processor 110 reduces the image resolution of each layer in the foundation layer represented by the tentative configuration. Any value may be set as the scale of reduction. When the image resolution of each layer in the foundation layer represented by the tentative configuration is a lower limit value, the processor 110 does not adjust the tentative configuration in terms of the image resolution.

The processor 110 reduces the concentration of the black layer represented by the tentative configuration, by a predetermined amount of reduction. In this embodiment, this predetermined amount of reduction is 10%. However, the predetermined amount of reduction may be another value such as 20%. The processor 110 also reduces the concentration of the white layer A and the white layer B represented by the tentative configuration, by a predetermined amount of reduction. In this embodiment, this predetermined amount of reduction is 40%. However, the predetermined amount of reduction may be another value such as 20% or 30%.

Through the above processing, the tentative configuration is adjusted in such a way as to reduce the concentration of each layer in the foundation layer.

After adjusting the tentative configuration in such a way as to adjust the image resolution of each layer in the foundation layer and the concentration of each layer, the processor 110 derives the transmittances $\alpha$ to $\gamma$ again, based on the adjusted tentative configuration. The processor 110 then multiplies the derived transmittances $\alpha$ to $\gamma$ and the transmittance $\delta$ and thus derives the transmittance R for the back-side incident light of the layer formed of the foundation layer of the adjusted tentative configuration and the image layer B combined. The processor 110 determines whether the derived transmittance R is within a predetermined range corresponding to the designated transmittance value or not. When the processor 110 has determined that the derived transmittance R is within the predetermined range corresponding to the designated transmittance value, the processor 110 decides the adjusted tentative configuration as the layer configuration of the foundation layer. More specifically, the processor 110 updates the content of the layer configuration of the foundation layer represented by the print condition 130b with the content of the tentative configuration. When the processor 110 has decided that the derived transmittance R is out of the predetermined range corresponding to the designated transmittance value, the processor 110 adjusts the tentative configuration again in terms of the image resolution of each layer in the foundation layer and the concentration of each layer.

Figure 8:
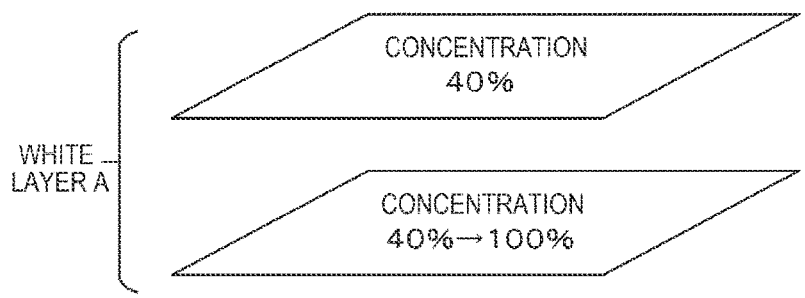
FIG. 8 explains an increase in the concentration of each layer in the foundation layer.

The processor 110 repeats the above processing until deciding the tentative configuration as the layer configuration of the foundation layer as the transmittance R for the back-side incident light of the layer formed of the foundation layer of the tentative configuration and the image layer B combined falls within the range corresponding to the designated transmittance value. In the adjustment of the tentative configuration, the concentration of each layer in the foundation layer represented by the tentative configuration may exceed 100% in some cases. The layer whose concentration exceeds 100% in this way is formed of a plurality of layers. For example, when the white layer A has a concentration of 140%, the white layer A is formed of one layer formed of a white coloring material and having a concentration of 100% and one layer formed of a white coloring material and having a concentration of 40%, as shown in FIG. 8.

The print control unit 111c is a function of controlling the printing of the print layer via the printing device 200.

By the function of the print control unit 111c, the processor 110 generates print data used by the printing device 200 to print the print layer, based on the image data 130a and the print condition 130b. The print data is data representing an aspect of the printing to be executed by the printing device 200. In this embodiment, the print data represents the print area in the print medium, the image resolution, the number of print paths, the amount of paint applied to each pixel, or the like.

The processor 110 generates print data of the image layers A, B, based on the image data 130a and various conditions for the printing of the image layers A, B represented by the print condition 130b. The processor 110 also generates print data of each layer in the foundation layer, based on the layer configuration of the foundation layer represented by the print condition 130b. At this point, the processor 110 also decides the number of print paths employed when forming each layer in the foundation layer, based on the layer configuration of the foundation layer represented by the print condition 130b.

The processor 110 transmits the generated print data to the printing device 200 and instructs the printing device 200 to print the print layer on the print medium.

The functions of the printing device 200 will now be described.

The processor 210 of the printing device 200 executes the print execution program 211 stored in the storage medium 230 and thus functions as a print execution unit 211a.

The print execution unit 211a is a function of executing the printing of the print layer on the print medium, using the print data transmitted from the information processing device 100. By the function of the print execution unit 211a, the processor 210 prints the image layer B, the white layer B, the black layer, the white layer A, and the image layer A in order in the print area on the print medium, based on the print data, and thus prints the print layer.

With the above configuration, the information processing device 100 decides the layer configuration of the foundation layer, based on the designated value of the transmittance of the layer formed of the foundation layer and the image layer B combined. Thus, the information processing device 100 can decide the layer configuration of the foundation layer without needing the user's subjective determination.

Also, in this embodiment, the information processing device 100 decides the layer configuration of the foundation layer, based on the designated transmittance value and the characteristic information 130c representing the characteristic of the paint used to form each layer in the print layer (transmittance for the back-side incident light of the layer formed of each paint used to form each layer in the print layer). Thus, the information processing device 100 can adjust the transmittance of the layer formed of the foundation layer and the image layer B combined, according to the characteristic of the paint used to form each layer.

Also, in this embodiment, the information processing device 100 determines whether the image layers A, B are light-colored or not, based on the type and concentration of the paint used to form the image layers A, B. When the transmittance of the layer formed of the foundation layer of the tentative configuration and the image layer B combined is out of the range corresponding to the designated transmittance value and is higher than the designated transmittance value, the information processing device 100 adjusts the tentative configuration in such a way as to increase the concentration of the white layers A, B serving as the foundation of the image layers A, B determined as being light-colored. Thus, the information processing device 100 can reduce the probability that the visually recognized color of the light-colored image layers A, B may change due to the black color of the black layer.

(1-2) Print Control Processing

Print control processing executed by the information processing device 100 will now be described, using FIGS. 9 and 10.

Figure 9:
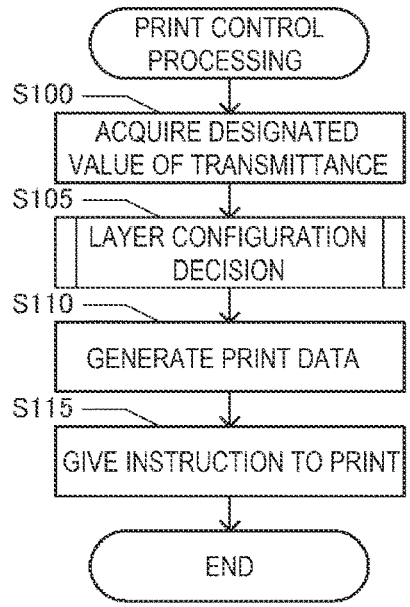
FIG. 9 is a flowchart showing an example of print control processing.
Figure 10:
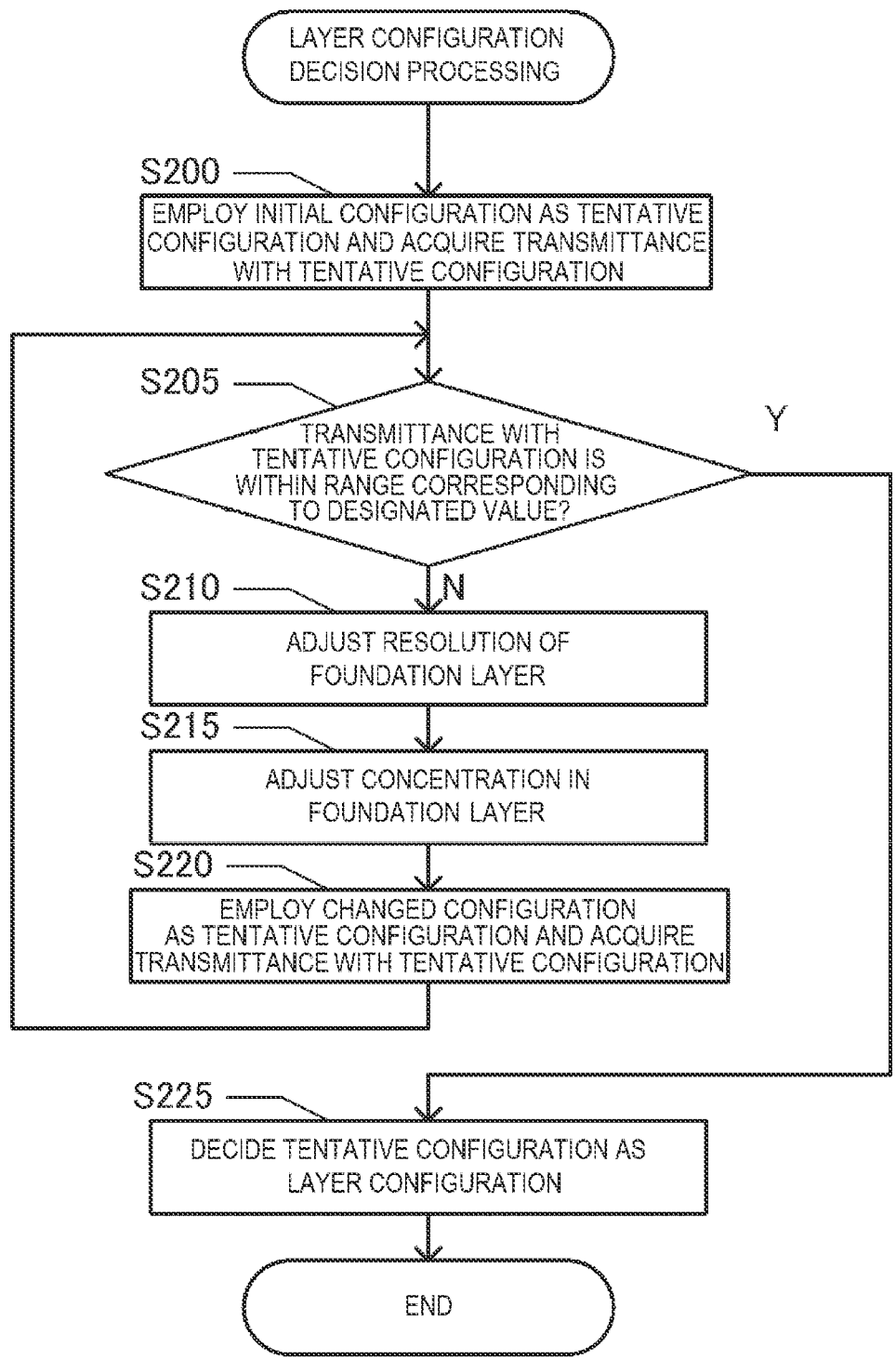
FIG. 10 is a flowchart showing an example of layer configuration decision processing.

The processor 110 starts the processing shown in FIG. 9 at a timing when a screen that is used to instruct the printing device 200 to print the print layer and that is used to designate the designated transmittance value, the print condition, and the like, is displayed on the UI unit 140.

In step S100, by the function of the acquisition unit 111a, the processor 110 accepts an input of the designated transmittance value, which is the designated value of the transmittance of the layer formed of the foundation layer and the image layer B combined, based on an operation to the UI unit 140 by the user, and thus acquires the designated transmittance value. The processor 110 also accepts an input of the print condition 130b, based on an operation to the UI unit 140 by the user, and stores the print condition 130b in the storage medium 130. After completing the processing of step S100, the processor 110 advances the processing to step S105. The processing of step S100 is an example of an acquisition step.

In step S105, by the function of the decision unit 111b, the processor 110 performs layer configuration decision processing of deciding the layer configuration of the foundation layer. The processing of step S105 is an example of a decision step. Details of the layer configuration decision processing will now be described, using FIG. 10.

In step S200, by the function of the decision unit 111b, the processor 110 acquires the initial value of the layer configuration of the foundation layer represented by the print condition 130b, as the tentative configuration, which is a tentative value of the layer configuration. The processor 110 acquires print image data in the case of printing the image layer B represented by the image data 130a with the image resolution represented by the print condition 130b.

The processor 110 acquires the image resolution and the concentration of the white coloring material in the white layer A of the tentative configuration, from the tentative configuration. The processor 110 then acquires the transmittance corresponding to the white coloring material, the acquired image resolution, the acquired concentration, and the back-side incident light from the characteristic information 130c, and defines this transmittance as the transmittance α. The processor 110 acquires the image resolution and the concentration of the K coloring material in the black layer of the tentative configuration, from the tentative configuration. The processor 110 then acquires the transmittance corresponding to the K coloring material, the acquired image resolution, the acquired concentration, and the back-side incident light from the characteristic information 130c, and defines this transmittance as the transmittance β. The processor 110 acquires the image resolution and the concentration of the white coloring material in the white layer B of the tentative configuration, from the tentative configuration. The processor 110 then acquires the transmittance corresponding to the white coloring material, the acquired image resolution, the acquired concentration, and the back-side incident light from the characteristic information 130c, and defines this transmittance as the transmittance γ.

The processor 110 selects a rectangular selected area of a predetermined size from the image layer B to be printed in the print area. The processor 110 derives the proportion of the number of pixels coated with the C coloring material to the total number of pixels in the selected area, as the concentration of the C image in the selected area, based on the print image data of the image layer B. Similarly, the processor 110 derives the proportion of the number of pixels coated with each of the M coloring material, the Y coloring material, and the K coloring material to the total number of pixels in the selected area, as the concentration of each of the M image, the Y image, and the K image in the selected area, based on the print image data of the image layer B.

The processor 110 acquires the transmittance corresponding to the C coloring material, the image resolution of the image layer B, the concentration of the C image in the selected area, and the back-side incident light, from the characteristic information 130c, and defines this transmittance as the transmittance for the back-side incident light of the C image in the selected area. The processor 110 acquires the transmittance corresponding to the M coloring material, the image resolution of the image layer B, the concentration of the M image in the selected area, and the back-side incident light, from the characteristic information 130c, and defines this transmittance as the transmittance for the back-side incident light of the M image in the selected area. The processor 110 acquires the transmittance corresponding to the Y coloring material, the image resolution of the image layer B, the concentration of the Y image in the selected area, and the back-side incident light, from the characteristic information 130c, and defines this transmittance as the transmittance for the back-side incident light of the Y image in the selected area. The processor 110 acquires the transmittance corresponding to the K coloring material, the image resolution of the image layer B, the concentration of the K image in the selected area, and the back-side incident light, from the characteristic information 130c, and defines this transmittance as the transmittance for the back-side incident light of the K image in the selected area.

The processor 110 multiplies the acquired transmittances for the back-side incident light of the C image, the M image, the Y image, and the K image in the selected area, and thus derives the transmittance for the back-side incident light of the selected area.

The processor 110 selects again a rectangular area of a predetermined size that is not selected yet, as a selected area, from the image layer B, and derives the transmittance for the back-side incident light of the selected area that is selected this time. The selected area that is selected this time may be an area partly overlapping the already selected area or may be an area that does not overlap the already selected area. The processor 110 repeats the above processing until deriving the transmittance for the back-side incident light of the rectangular areas of all the predetermined sizes included in the image layer B. The processor 110 specifies the maximum transmittance from among the derived transmittances and defines the maximum transmittance as the transmittance δ of the image layer B.

The processor 110 multiplies the transmittances α, β, γ, δ and thus derives the transmittance R.

The processor 110 also determines whether the image layer A and the image layer B are light-colored or not, based on the type and concentration of the paint used to form each of the image layer A and the image layer B. More specifically, the processor 110 acquires the print image data of the image layer A as in the case of the print image data of the image layer B. The processor 110 specifies the type of the paint used to form the image layer A, based on the print image data of the image layer A. The processor 110 specifies the concentration of each specified type of paint in the entirety of the image layer A, based on the print image data of the image layer A. In this embodiment, the correspondence information between the concentration in the image of each type of paint used to form the image and whether the image is light-colored or not, is stored in the storage medium 130 in advance. The processor 110 determines whether the image layer A is light-colored or not, based on the type of the paint used to form the image layer A, the concentration of each type of paint, and the correspondence information. The processor 110 similarly determines whether the image layer B is light-colored or not.

After completing the processing of step S200, the processor 110 advances the processing to step S205.

In step S205, by the function of the decision unit 111b, the processor 110 determines whether the transmittance R is within a predetermined range corresponding to the designated transmittance value acquired in step S100 or not. When the processor 110 has determined that the transmittance R is within the predetermined range corresponding to the designated transmittance value, the processor 110 advances the processing to step S225. When the processor 110 has determined that the transmittance R is out of the predetermined range corresponding to the designated transmittance value, the processor 110 advances the processing to step S210.

In step S210, by the function of the decision unit 111*b*, the processor 110 performs processing of adjusting the image resolution of the foundation layer represented by the tentative configuration. The processing of step S210 will be described below with respect to a case where the transmittance R is higher than the designated transmittance value and a case where the transmittance R is lower than the designated transmittance value.

The case where the transmittance R is higher than the designated transmittance value will now be described. The processor 110 increases the image resolution of each layer in the foundation layer of the tentative configuration. Any value can be set as the scale of increase. When the image resolution of each layer in the foundation layer of the tentative configuration is an upper limit value, the processor 110 does not adjust the tentative configuration in terms of the image resolution.

The case where the transmittance R is lower than the designated transmittance value will now be described. The processor 110 reduces the image resolution of each layer in the foundation layer of the tentative configuration. Any value can be set as the scale of reduction. When the image resolution of each layer in the foundation layer of the tentative configuration is a lower limit value, the processor 110 does not adjust the tentative configuration in terms of the image resolution.

After completing the processing of step S210, the processor 110 advances the processing to step S215.

In step S215, by the function of the decision unit 111*b*, the processor 110 performs processing of adjusting the concentration of each layer in the foundation layer represented by the tentative configuration. The processing of step S215 will be described below with respect to the case where the transmittance R is higher than the designated transmittance value and the case where the transmittance R is lower than the designated transmittance value.

The case where the transmittance R is higher than the designated transmittance value will now be described. The processor 110 increases the concentration of the black layer represented by the tentative configuration, by a predetermined amount of increase. The processor 110 increases the concentration of the white layer A and the white layer B represented by the tentative configuration, by a predetermined amount of increase that is larger than the amount of increase in the concentration of the black layer. When the image layer A is light-colored, the processor 110 increases the concentration of the white layer A serving as the foundation of the image layer A and represented by the tentative configuration, by a predetermined amount of increase. When the image layer B is light-colored, the processor 110 increases the concentration of the white layer B serving as the foundation of the image layer B and represented by the tentative configuration, by a predetermined amount of increase.

The case where the transmittance R is lower than the designated transmittance value will now be described. The processor 110 reduces the concentration of the black layer represented by the tentative configuration, by a predetermined amount of reduction. The processor 110 reduces the concentration of the white layer A and the white layer B represented by the tentative configuration, by a predetermined amount of reduction.

After completing the processing of step S215, the processor 110 advances the processing to step S220.

In step S220, by the function of the decision unit 111*b*, the processor 110 derives the transmittances $\alpha$ to $\gamma$ again, based on the tentative configuration adjusted immediately before in steps S210 and S215. The processor 110 derives a value resulting from the multiplication of the derived transmittances $\alpha$ to $\gamma$ and the transmittance $\delta$, as a new transmittance R. After completing the processing of step S220, the processor 110 advances the processing to step S205.

In step S225, by the function of the decision unit 111*b*, the processor 110 decides the tentative configuration as the layer configuration of the foundation layer. More specifically, the processor 110 updates the content of the layer configuration of the foundation layer represented by the print condition 130*b* with the content of the tentative configuration. After completing the processing of step S225, the processor 110 completes the processing shown in FIG. 10 and advances the processing to step S110.

In step S110, by the function of the print control unit 111*c*, the processor 110 generates print data used by the printing device 200 to print the print layer, based on the image data 130*a* and the print condition 130*b*. After completing the processing of step S110, the processor 110 advances the processing to step S115.

In step S115, the processor 110 transmits the print data generated in step S110 to the printing device 200 and instructs the printing device 200 to print the print layer on the print medium. In response to this instruction, the processor 210 of the printing device 200 prints the print layer on the print medium via the print head 240 by the function of the print execution unit 211*a*.

(2) Second Embodiment

The printing device 200 in the first embodiment ejects each paint in a predetermined amount to each pixel to be coated with the paint. In this embodiment, the printing device 200 can adjust the amount of the paint ejected to a pixel to be coated with the paint. In the description below, the amount of the paint ejected to one pixel by the printing device 200 is referred to as an amount of paint droplets. In this embodiment, the printing device 200 ejects the paint in one of three amounts of paint droplets to one pixel. The three amounts of paint droplets are referred to as "small", "medium", and "large" in order from the smallest amount. That is, with one paint, one pixel is in one of four states, that is, a state of being coated with the paint in the "small" amount of paint droplets, a state of being coated with the paint in the "medium" amount of paint droplets, a state of being coated with the paint in the "large" amount of paint droplets, and a state of being not coated with the paint. In this embodiment, each pixel included in the image layers A, B is coated with the paint in one of the "small", "medium", and "large" amounts of paint droplets. In each layer in the foundation layer, all the pixels included in the layer are coated with the paint in the same amount of paint droplets.

In this embodiment, the concentration of each paint is defined for each amount of paint droplets. Thus, in this embodiment, the concentration of a paint applied in one amount of paint droplets represents the proportion of the number of pixels coated with the paint in this amount of paint droplets to the total number of pixels in the target area.

The print condition 130b in this embodiment represents the amount of paint droplets for each layer in the foundation layer in addition to information similar to the information in the first embodiment.

The characteristic information 130c in this embodiment will now be described, using FIG. 11. The characteristic information 130c in this embodiment represents the light transmittance in the case where one layer is formed by applying one type of paint in the same amount of paint droplets and under various conditions (image resolution, concentration) in an area of a specific size and where various kinds of light enter the one layer thus formed. In this embodiment, the characteristic information 130c is stored in the storage medium 130 in advance.

As shown in FIG. 11, the characteristic information 130c in this embodiment is table information showing the correspondence between the type of the paint, the amount of paint droplets, the image resolution (dpi), the concentration (%), the incident light, and the transmittance. The characteristic information 130c is found by applying various types of paints with various image resolutions, various concentrations, and various amounts of paint droplets in advance, then making various kinds of light enter the coated area, and measuring the transmittance.

Differences between this embodiment and the first embodiment in the functions of and the processing by the information processing device 100 will now be described.

In this embodiment, the functions of the decision unit 111b and the print control unit 111c differ from those in the first embodiment. The decision unit 111b in this embodiment differs from the decision unit 111b in the first embodiment in taking the amount of paint droplets into account when finding the transmittance of each layer in the print layer. The print control unit 111c in this embodiment differs from the print control unit 111c in the first embodiment in deciding the amount of paint droplets for each pixel to be coated with the paint on the print medium, as the print data of each layer included in the print layer.

Processing by the information processing device in this embodiment will now be described, using FIGS. 9 and 10.

Step 100 is similar step S100 in the first embodiment. After completing the processing of step S100, the processor 110 advances the processing to step S105.

In step S105, by the function of the decision unit 111b, the processor 110 performs layer configuration decision processing of deciding the layer configuration of the foundation layer. Details of the layer configuration decision processing will now be described, using FIG. 10.

In step S200, by the function of the decision unit 111b, the processor 110 acquires the initial value of the layer configuration of the foundation layer represented by the print condition 130b, as the tentative configuration, which is a tentative value of the layer configuration. The processor 110 acquires print image data in the case of printing the image layer B represented by the image data 130a with the image resolution represented by the print condition 130b, based on the image data 130a and the print condition 130b. The print image data in this embodiment is data representing which paint to apply in what amount of paint droplets to which pixel with what image resolution in the print area on the print medium.

The processor 110 acquires the image resolution and the concentration of the white coloring material in the white layer A of the tentative configuration, from the tentative configuration. The processor 110 then acquires the transmittance corresponding to the white coloring material, the amount of paint droplets corresponding to the white layer A represented by the print condition 130b, the acquired image resolution, the acquired concentration, and the back-side incident light, from the characteristic information 130c, and defines this transmittance as the transmittance α. The processor 110 also acquires the image resolution and the concentration of the K coloring material in the black layer of the tentative configuration, from the tentative configuration. The processor 110 then acquires the transmittance corresponding to the K coloring material, the amount of paint droplets corresponding to the black layer represented by the print condition 130b, the acquired image resolution, the acquired concentration, and the back-side incident light, from the characteristic information 130c, and defines this transmittance as the transmittance β. The processor 110 also acquires the image resolution and the concentration of the white coloring material in the white layer B of the tentative configuration, from the tentative configuration. The processor 110 then acquires the transmittance corresponding to the white coloring material, the acquired image resolution, the amount of paint droplets corresponding to the white layer B represented by the print condition 130b, the acquired concentration, and the back-side incident light, from the characteristic information 130c, and defines this transmittance as the transmittance γ.

The processor 110 selects a rectangular selected area of a predetermined size from the image layer B to be printed in the print area. Processing of finding the transmittance of the C image in the selected area in this embodiment will now be described, using FIG. 12. The processor 110 derives the proportion of the number of dots coated with the C coloring material in the same amount of paint droplets to the total number of dots in the selected area, as the concentration of the C image with each amount of paint droplets in the selected area, based on the print image data of the image layer B. More specifically, the processor 110 acquires the transmittance corresponding to the C coloring material, the "small" amount of paint droplets, the image resolution of the image layer B, the concentration of the C image with the "small" amount of paint droplets in the selected area (image formed of the C coloring material applied in the "small" amount of paint droplets), and the back-side incident light, from the characteristic information 130c, and defines this transmittance as the transmittance for the back-side incident light of the C image with the "small" amount of paint droplets in the selected area. The processor 110 also acquires the transmittance corresponding to the C coloring material, the "medium" amount of paint droplets, the image resolution of the image layer B, the concentration of the C image with the "medium" amount of paint droplets in the selected area, and the back-side incident light, from the characteristic information 130c, and defines this transmittance as the transmittance for the back-side incident light of the C image with the "medium" amount of paint droplets in the selected area. The processor 110 also acquires the transmittance corresponding to the C coloring material, the "large" amount of paint droplets, the image resolution of the image layer B, the concentration of the C image with the "large" amount of paint droplets in the selected area, and the back-side incident light, from the characteristic information 130c, and defines this transmittance as the transmittance for the back-side incident light of the C image with the "large" amount of paint droplets in the selected area. The processor 110 then multiplies the acquired transmittances of the C images with the "small", "medium", and "large" amounts of paint droplets in the selected area and thus derives the transmittance for the back-side incident light of the C image in the selected area.

The processor 110 derives the transmittance for the back-side incident light of each of the M image, the Y image, and the K image, as in the case of the C image in the selected area.

The processor 110 multiplies the acquired transmittances for the back-side incident light of the C image, the M image, the Y image, and the K image in the selected area, and thus derives the transmittance for the back-side incident light of the selected area.

The processor 110 selects again a rectangular area of a predetermined size that is not selected yet, as a selected area, from the image layer B, and derives the transmittance for the back-side incident light of the selected area that is selected this time. The processor 110 repeats the above processing until deriving the transmittance for the back-side incident light of the rectangular areas of all the predetermined sizes included in the image layer B. The processor 110 specifies the maximum transmittance from among the derived transmittances and defines the maximum transmittance as the transmittance δ of the image layer B.

The processor 110 multiplies the transmittances α, β, γ, δ and thus derives the transmittance R.

The processor 110 also determines whether the image layer A and the image layer B are light-colored or not, based on the type and concentration of the paint used to form each of the image layer A and the image layer B. More specifically, the processor 110 acquires the print image data of the image layer A as in the case of the print image data of the image layer B. The processor 110 specifies the type of the paint used to form the image layer A, based on the print image data of the image layer A. The processor 110 specifies the concentration of each specified type of paint in each amount of paint droplets in the entirety of the image layer A, based on the print image data of the image layer A. In this embodiment, the correspondence information between the concentration in the image of each type of paint in each amount of paint droplets used to form the image and whether the image is light-colored or not, is stored in the storage medium 130 in advance. The processor 110 determines whether the image layer A is light-colored or not, based on the type of the paint used to form the image layer A, the concentration of each type of paint in each amount of paint droplets, and the correspondence information. The processor 110 similarly determines whether the image layer B is light-colored or not.

After completing the processing of step S200, the processor 110 advances the processing to step S205.

The processing of steps S205 to S215 is similar to the processing in the first embodiment. After completing the processing of step S215, the processor 110 advances the processing to step S220.

In step S220, by the function of the decision unit 111b, the processor 110 derives the transmittances α to γ again, based on the tentative configuration adjusted immediately before in steps S210 and S215. The processor 110 derives a value resulting from the multiplication of the derived transmittances α to γ and the transmittance δ, as a new transmittance R. After completing the processing of step S220, the processor 110 advances the processing to step S205.

The processing of step S225 is similar to the processing in the first embodiment. After completing the processing of step S225, the processor 110 completes the processing shown in FIG. 10 and advances the processing to step S110.

In step S110, by the function of the print control unit 111c, the processor 110 generates print data used by the printing device 200 to print the print layer, based on the image data 130a and the print condition 130b. At this point, the processor 110 decides the amount of paint droplets of the paint to be applied to each pixel in each layer in the print layer and includes information about the decided amount of paint droplets in the print data. After completing the processing of step S110, the processor 110 advances the processing to step S115.

The processing of step S115 is similar to the processing in the first embodiment.

In this way, with the configuration according to this embodiment, the information processing device 100 can decide the transmittance of the foundation layer even when the amount of the paint ejected to each pixel by the printing device 200 is not constant.

(3) Other Embodiments

The foregoing embodiments are simply examples for carrying out the present disclosure. Various other embodiments can also be employed. For example, while the information processing device 100 and the printing device 200 are formed by different devices from each other in the foregoing embodiments, the two devices may be formed as the same device. For example, each function of the information processing device 100 may be installed in the printing device 200. The information processing device 100 may also be formed by a plurality of devices. The order of the processing steps in the flowchart shown in FIG. 10 may differ. For example, the order of the processing of steps S210 and S215 may be changed.

In the foregoing embodiments, the processor 110 acquires a value designated by the user as the designated transmittance value. However, the processor 110 may acquire another value as the designated transmittance value. For example, the processor 110 may acquire a designated transmittance value used in the printing performed in the past, as the designated transmittance value.

In the foregoing embodiments, the printing device 200 performs printing using the C coloring material, the M coloring material, the Y coloring material, the K coloring material, and the white coloring material. However, the printing device 200 may perform printing without using a part of the C coloring material, the M coloring material, the Y coloring material, the K coloring material, and the white coloring material, or may perform printing using another paint such as a paint to achieve a surface effect (for example, a clear ink, a varnish or the like).

In the foregoing embodiments, the print layer is formed of the image layer A, the foundation layer, and the image layer B. However, the print layer may also have another configuration. For example, the print layer may not include one of the image layer A and the image layer B and may be formed of the other image layer and the foundation layer. The print layer may also include another layer. For example, the print layer may include a layer formed of a clear ink at least at one of a position more to the front side than the image layer A and a position more to the back side than the image layer B.

In the foregoing embodiments, the foundation layer is formed of the two white layers (white layers A, B) and the black layer arranged between the two white layers. However, the foundation layer may have another configuration. For example, the foundation layer may be formed of one of the white layer and the black layer. For example, when the black color is to be used as the background of the image layers A, B, or the like, the foundation layer may not include the white layer. Meanwhile, when the light expected to enter the print medium has an intensity that can be sufficiently blocked even by the white layer alone, or the like, the foundation layer may not include the black layer. The foundation layer may also include another layer than the black layer and the white layer. For example, the foundation layer may include a layer formed of a clear ink. Also, when it is desired that the background of the image layer is in a different color from white and black (for example, red, blue, or the like) from an aesthetic point of view, the foundation layer may include a layer formed of a coloring material of this color.

In the foregoing embodiments, the processor 110 decides the layer configuration of the foundation layer in such a way that the transmittance for the back-side incident light of the layer formed of the image layer B and the foundation layer combined falls within the range corresponding to the designated transmittance value. However, the processor 110 may decide the layer configuration of the foundation layer in such a way that the transmittance for the back-side incident light of another layer including the foundation layer falls within the range corresponding to the designated transmittance value. For example, the processor 110 may acquire a designated value of the transmittance for the back-side incident light of the entirety of the print layer, as the designated transmittance value, and may decide the layer configuration of the foundation layer in such a way that the transmittance for the back-side incident light of the entirety of the print layer falls within the range corresponding to the designated transmittance value. In this case, for example, the processor 110 can find the transmittance for the back-side incident light of the entirety of the print layer by multiplying the transmittance for the back-side incident light of each layer in the foundation layer, the transmittance for the back-side incident light of the image layer B, and the transmittance for the back-side incident light of the image layer A.

The processor 110 may also acquire a designated value of the transmittance for the back-side incident light of the foundation layer and may decide the layer configuration of the foundation layer in such a way that the transmittance for the back-side incident light of the foundation layer falls within the range corresponding to the designated value.

In the foregoing embodiments, the processor 110 decides the layer configuration of the foundation layer in such a way that the transmittance for the back-side incident light of the layer including the foundation layer is within the range corresponding to the designated value. However, the processor 110 may decide the layer configuration of the foundation layer in such a way that the transmittance for the front-side incident light of the layer including the foundation layer is within the range corresponding to the designated value. For example, the processor 110 may acquire a designated value of the transmittance of the layer formed of the image layer A and the foundation layer combined and may decide the layer configuration of the foundation layer in such a way that the transmittance for the front-side incident light of the layer formed of the image layer A and the foundation layer combined falls within the range corresponding to the designated value. The processor 110 may also acquire a designated value of the transmittance for the front-side incident light of the entirety of the print layer, as the designated transmittance value, and may decide the layer configuration of the foundation layer in such a way that the transmittance for the front-side incident light of the entirety of the print layer falls within the range corresponding to the designated transmittance value. The processor 110 may also acquire a designated value of the transmittance for the front-side incident light of the foundation layer, as the designated transmittance value, and may decide the layer configuration of the foundation layer in such a way that the transmittance for the front-side incident light of the foundation layer falls within the range corresponding to the designated transmittance value.

The processor 110 may also acquire both of a designated value of the transmittance for the back-side incident light of a first layer including the foundation layer (for example, the foundation layer and the image layer B combined, the entirety of the print layer, or the like) and a designated value of the transmittance for the front-side incident light of a second layer including the foundation layer (for example, the foundation layer and the image layer A combined, the entirety of the print layer, or the like), and may do as follows. That is, the processor 110 may decide the layer configuration of the foundation layer in such a way that the transmittance for the back-side incident light of the first layer falls within the range corresponding to the designated value of the transmittance for the back-side incident light of the first layer and that the transmittance for the front-side incident light of the second layer falls within the range corresponding to the designated value of the transmittance for the front-side incident light of the second layer.

In the foregoing embodiments, the processor 110 finds the transmittance of the layer formed of the foundation layer of the tentative configuration and the image layer B combined, and when the resulting transmittance is out of the range corresponding to the designated transmittance value, the processor 110 adjusts the tentative configuration in the following manner. That is, the processor 110 increases or reduces and thus adjusts each of the image resolution of each layer in the foundation layer of the tentative configuration and the concentration of each layer. The processor 110 decides the adjusted tentative configuration as the layer configuration of the foundation layer. However, the processor 110 may adjust the tentative configuration of the foundation layer by another method. For example, the processor 110 may adjust one of the image resolution of each layer in the foundation layer of the tentative configuration and the concentration of each layer and may not adjust the other. The processor 110 may also adjust the tentative configuration by increasing a part of the concentration of each layer in the foundation layer of the tentative configuration and reducing a part thereof.

In the foregoing embodiments, the processor 110 derives the transmittance of the selected area having the highest transmittance among the selected areas selected from the image layer B, as the transmittance δ of the image layer B. However, the processor 110 may derive another transmittance as the transmittance δ of the image layer B. For example, the processor 110 may derive a statistical value (for example, the average value or the like) of the transmittances of a plurality of selected areas selected from the image layer B, as the transmittance δ of the image layer B. The processor 110 may also derive the transmittance of the selected area having the lowest transmittance among the selected areas selected from the image layer B, as the transmittance δ of the image layer B.

In the foregoing embodiments, the processor 110 determines whether each of the image layer A and the image layer B is light-colored or not, based on the concentration in the entirety of the image layer of each paint used to form the image layer. However, the processor 110 may determine whether the image layer is light-colored or not, based on the concentration of each paint in a partial area in the image layer.

The processor 110 may also determine whether each of the image layer A and the image layer B is light-colored or not, based on a different indicator from the concentration in the image layer of each paint used to form the image layer. For example, the processor 110 may determine whether each of the image layer A and the image layer B is light-colored or not, based on the brightness of the image layer. For example, the processor 110 may determine that each of the image layer A and the image layer B is light-colored, when the brightness of an area included in the image layer (for example, any partial area, the entire area, or the like) is equal to or higher than a predetermined threshold.

In the foregoing embodiments, the black layer is formed of the K coloring material. However, the black layer may be formed of the C coloring material, the M coloring material, and the Y coloring material at the same concentration, in addition to the K coloring material. In this case, the processor 110 may find the transmittance for predetermined light of the black layer in the following manner. In this case, the black layer is divided into a C image, an M image, a Y image, and a K image formed of the C coloring material, the M coloring material, the Y coloring material, and the K coloring material, respectively. Thus, the processor 110 may derive the transmittances for the predetermined light of the C image, the M image, the Y image, and the K image in the black layer, then multiply the derived transmittances, and thus find the transmittance for the predetermined light of the black layer.

In the foregoing embodiments, the processor 110 acquires the transmittance corresponding to the image resolution of each layer and the concentration of the paint in each layer from the characteristic information 130c prepared in advance and thus finds the transmittance for predetermined light of each layer. However, the processor 110 may find the transmittance of each layer by another method. For example, the processor 110 may find the transmittance for the predetermined light of each layer, using a relational model between the image resolution of each layer, the concentration of the paint in each layer, and the transmittance for the predetermined light of each layer, which is machine-learned in advance.

In the foregoing embodiments, the concentration is the proportion of the number of pixels coated with the paint to the total number of pixels in the target area. However, the concentration may be another indicator. For example, the concentration may be the proportion of the area of the area coated with the paint to the area of the target area. In this case, for example, if correspondence information between the amount of the paint to be applied to a pixel and the area occupied by the paint in this amount on the print medium is prepared in advance, the processor 110 may do as follows. That is, the processor 110 specifies a pixel coated with the target paint, from among the pixels in the target area, and the amount of the paint applied to each pixel. The processor 110 then specifies the area occupied by the paint at each specified pixel, from the correspondence information between the amount of the paint and the area, which is prepared in advance, and defines the total of the specified areas as the area occupied by the target paint in the target area. The processor 110 may find the proportion of this area to the entire target area, as the concentration of this paint in the target area.

In the second embodiment, the processor 110 adjusts the image resolution of each layer in the foundation layer and the concentration and thus adjusts the tentative configuration, as in the first embodiment. However, the processor 110 may also adjust the amount of paint droplets of each layer in the foundation layer, as the adjustment of the tentative configuration.

The present disclosure can also be applied as a program executed by a computer and as a method. The system, the program, and the method as described above may be implemented as a single device or may be implemented using components of a plurality of devices and therefore include various aspects. The system, the program, and the method can be changed according to need, such as being implemented partly by software and partly by hardware. Also, the present disclosure may be implemented as a recording medium storing a program for controlling the system. Of course, the recording medium storing the program may be a magnetic recording medium or a semiconductor memory. Any recording medium to be developed in the future can be similarly employed.

The foregoing embodiments should not limit the present disclosure. The embodiments include a plurality of technical ideas having different effects. Therefore, one problem or effect that can be grasped from the embodiments is not necessarily a problem or effect of all the technical ideas included in the embodiments.

What is claimed is:

1. An information processing device comprising:
an acquisition unit acquiring a designated value of a transmittance of one or more layers included in a plurality of layers stacked on each other and printed on a print medium, the plurality of layers including one or two image layers printed to be visible from one side of the print medium and a foundation layer serving as a foundation of the one or two image layers, the one or more layers including the foundation layer; and
a decision unit deciding a layer configuration that is a configuration of the foundation layer, based on the designated value acquired by the acquisition unit.

2. The information processing device according to claim 1, wherein
the acquisition unit acquires the designated value of the transmittance of the one or more layers for predetermined light expected to enter the plurality of layers, and
the decision unit decides the layer configuration, based on the designated value acquired by the acquisition unit and a transmittance for the predetermined light of a layer formed of each paint used to form each layer of the one or more layers.

3. The information processing device according to claim 1, wherein
a paint used to form each layer of the plurality of layers is ejected from a print head used to print the plurality of layers, and
the layer configuration represents an image resolution of each layer in the foundation layer.

4. The information processing device according to claim 1, wherein
a paint used to form each layer of the plurality of layers is cured by irradiation with ultraviolet light.

5. The information processing device according to claim 1, wherein
the foundation layer is used as one or more of a light-shielding layer used to block light and an assisting layer assisting color development of the image layer.

6. The information processing device according to claim 1, wherein
the foundation layer includes one or more of a white layer that is a white-colored layer and a black layer that is a black-colored layer.

7. The information processing device according to claim 6, wherein the foundation layer includes the white layer and the black layer, and the decision unit decides the layer configuration of the white layer serving as a foundation of the image layer, based on a color of the image layer.

8. An information processing method executed by an information processing device, the method comprising:

an acquisition step of acquiring a designated value of a transmittance of one or more layers included in a plurality of layers stacked on each other and printed on a print medium, the plurality of layers including one or two image layers printed to be visible from one side of the print medium and a foundation layer serving as a foundation of the one or two image layers, the one or more layers including the foundation layer; and a decision step of deciding a layer configuration that is a configuration of the foundation layer, based on the designated value acquired in the acquisition step.

9. A non-transitory computer-readable storage medium storing a program, the program causing a computer to execute:

an acquisition step of acquiring a designated value of a transmittance of one or more layers included in a plurality of layers stacked on each other and printed on a print medium, the plurality of layers including one or two image layers printed to be visible from one side of the print medium and a foundation layer serving as a foundation of the one or two image layers, the one or more layers including the foundation layer; and a decision step of deciding a layer configuration that is a configuration of the foundation layer, based on the designated value acquired in the acquisition step.

* * * * *